(12) United States Patent
Reid et al.

(10) Patent No.: US 12,341,566 B2
(45) Date of Patent: Jun. 24, 2025

(54) ACCURACY ADAPTIVE SYMBOLOGY FOR HEAD WORN DISPLAY

(71) Applicant: Rockwell Collins, Inc., Cedar Rapids, IA (US)

(72) Inventors: Alexander D. Reid, Tualatin, OR (US); William T. Kirchner, Ashburn, VA (US); Christopher M. Boggs, Gainesville, VA (US); Brandon E. Wilson, Portland, OR (US); Troy D. Driscoll, West Linn, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 494 days.

(21) Appl. No.: 17/705,751

(22) Filed: Mar. 28, 2022

(65) Prior Publication Data
US 2023/0308195 A1   Sep. 28, 2023

(51) Int. Cl.
*G02B 27/00* (2006.01)
*B64D 45/08* (2006.01)
*G02B 27/01* (2006.01)
*H04B 17/318* (2015.01)

(52) U.S. Cl.
CPC .......... *H04B 17/318* (2015.01); *B64D 45/08* (2013.01); *G02B 27/0093* (2013.01); *G02B 27/017* (2013.01); *G02B 2027/0138* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 9,316,831 B2 | 4/2016 | Takahashi et al. | |
| 9,479,949 B1 | 10/2016 | Oroskar et al. | |
| 9,785,231 B1 | 10/2017 | Zimmerman et al. | |

(Continued)

FOREIGN PATENT DOCUMENTS

| | | |
|---|---|---|
| EP | 2715432 A2 | 4/2014 |
| GB | 2330988 A | 5/1999 |
| WO | 2020160308 A1 | 8/2020 |

OTHER PUBLICATIONS

Extended European Search Report dated Sep. 1, 2023; European Application No. 23163865.1.

*Primary Examiner* — Minh Trang T Nguyen
(74) *Attorney, Agent, or Firm* — Suiter Swantz IP

(57) ABSTRACT

A system and method for modifying symbology displayed on a head worn display (HWD) based on a quality-of-service value is disclosed. The system includes a head worn display configured to display symbology, a tracking camera, a controller, and a tracking processing unit configured to receive inputs form the tracking camera and transmit a signal quality value to the controller. The controller includes processors and memory with instructions that when executed by the processors, cause the processors to display the symbology on the display, determine a quality-of-service value based on at least the signal quality value, and modify at least one symbol of the symbology based on the quality-of-service value from a default symbol to a degraded symbol if the quality-of-service value changes from a high-quality value to a low-quality value. The system may also receive sensor signals from other sensors, and use the sensor signal to determine the quality-of-service value.

15 Claims, 6 Drawing Sheets

(56) References Cited

U.S. PATENT DOCUMENTS

| | | |
|---|---|---|
| 10,308,371 B1 | 6/2019 | Tiana et al. |
| 2008/0189637 A1 | 8/2008 | Krajewski et al. |
| 2010/0231418 A1 | 9/2010 | Whitlow et al. |
| 2015/0234050 A1* | 8/2015 | Larson ............... G02B 27/0101 356/369 |
| 2016/0035139 A1* | 2/2016 | Fuchs ................... G06T 19/006 345/633 |
| 2019/0129177 A1 | 5/2019 | Roimi et al. |
| 2020/0169486 A1 | 5/2020 | Kwok et al. |
| 2020/0249748 A1* | 8/2020 | Ranganathan .......... A63F 13/40 |

* cited by examiner

ACCURACY ADAPTIVE SYMBOLOGY FOR HEAD WORN DISPLAY

BACKGROUND

In a head worn display (HWD) the accuracy of the head tracking solution can vary over time depending on a variety of factors: operating environment, health of equipment, geometry, installation constraints, aircraft and/or head motion histories, sensor errors and latencies. These variations can cause one or more symbols of a symbology displayed on the HWD to be less accurate or precise. Imprecise/inaccurate symbology can lead to hazardous situations; however, an imprecise/inaccurate symbol of a symbology can still provide value to a pilot as long as the pilot has information relating to the accuracy and/or precision of the symbol. Currently, HWD systems are unable to convey the accuracy or the precision of displayed symbology to a user via the HWD. Therefore, it is desirable to provide a system or method that can determine the accuracy and/or precision of a symbol of an HWD symbology, and convey that accuracy and/or precision information to a user.

SUMMARY

A system is disclosed. In one or more embodiments, the system includes a head worn display configured to display symbology of an operating environment. In one or more embodiments, the system further includes a tracking camera. In one or more embodiments, the system further includes a tracking processing unit communicatively coupled to the tracking camera. In one or more embodiments, the tracking processing unit is configured to determine a position and orientation of the head worn display. In one or more embodiments, the tracking processing unit is configured to transmit a position and orientation signal to a controller, wherein the position and orientation signal includes a signal quality value. In one or more embodiments, the system further includes a controller communicatively coupled to the head worn display and the tracking camera. In one or more embodiments, the system further includes one or more processors and a memory with instructions stored upon. In one or more embodiments, the instructions, when executed by the one or more processors, cause the one or more processors to display the symbology on the head worn display. In one or more embodiments, the instructions, when executed by the one or more processors, further cause the one or more processors to determine a quality-of-service value based on at least the signal quality value. In one or more embodiments, the instructions, when executed by the one or more processors, further cause the one or more processors to modify at least one symbol of the symbology based on the quality-of-service value from a default symbol to a degraded symbol if the quality-of-service value changes from a high-quality value to a low-quality value.

In some embodiments of the system, the instructions further cause the one or more processors to receive a sensor signal from one or more sensors and use the sensor signal to determine the quality-of-service value.

In some embodiments of the system, the quality-of-service value comprises an accuracy characteristic.

In some embodiments of the system the quality-of-service value comprises a precision characteristic.

In some embodiments of the system the quality-of-service value comprises a signal strength characteristic.

In some embodiments of the system the degraded symbol is configured as a removed symbol.

In some embodiments of the system the degraded symbol is configured with a different color than the default symbol.

In some embodiments of the system the degraded symbol is configured with a different line width or different from than the default symbol.

In some embodiments of the system the degraded symbol is configured with a different line type than the default symbol.

In some embodiments of the system wherein the controller is communicatively coupled to a vision system.

In some embodiments of the system, the system further comprises an inertial sensor communicatively coupled to at least one of the head worn display or the tracking processing unit.

In some embodiments of the system, the symbol represents a confidence line of a path.

In some embodiments of the system, the path is configured as a runway.

A method for modifying symbology displayed on a head worn display (HWD) based on a quality-of-service value is disclosed. In one or more embodiments, the method includes determining a position and orientation of the HWD. In one or more embodiments, the method further includes transmitting a position and orientation signal to a controller, wherein the position and orientation signal includes a signal quality value. In one or more embodiments, the method further includes determining a quality-of-service value based on at least the signal quality value. In one or more embodiments, the method further includes displaying symbology on the HWD, wherein at least one symbol of the symbology is modified from a default form to a degraded form based on the quality-of-service value.

In one or more embodiments of the method, the method further includes receiving a sensor signal from one or more sensors. In one or more embodiments of the method, the method further includes using the sensor signal to determine the quality-of-service value.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
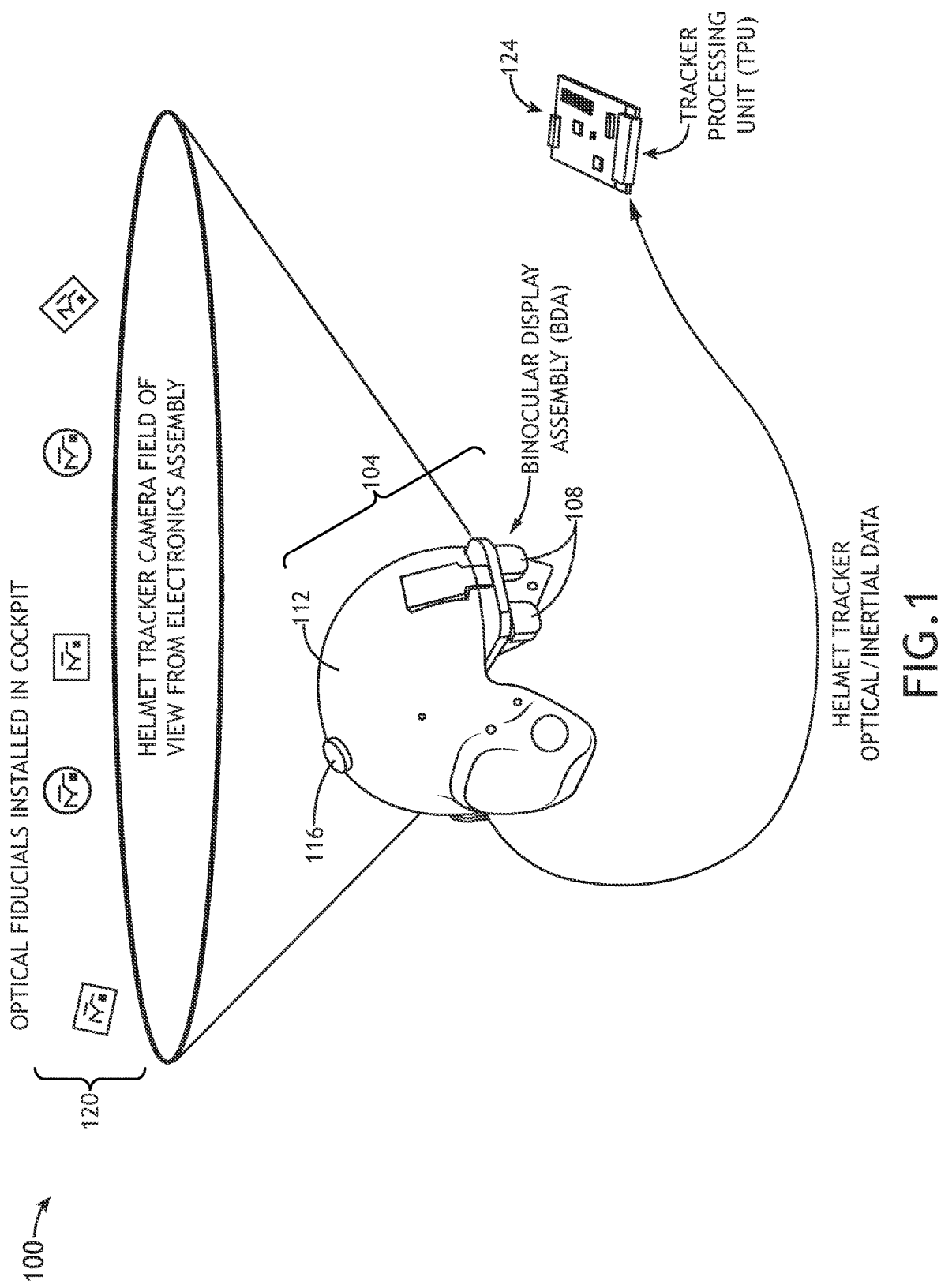
FIG. 1 is a diagram of a HWD system, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Disclosed is a system and method for presenting accuracy adaptive symbology to a head worn display (HWD). In general, HWDs require tracking devices that track the movement of the head of a user. This tracking allows HWD systems to correctly display symbology onto the eyepieces of the HWD. Tracking devices require constant signaling between HWD components for correct displaying of symbology. This signaling can become suboptimal due to component failure, environmental factors (e.g., jamming) and other system malfunctions. Suboptimal signaling can be catastrophic if the user is heavily dependent upon the HWD for hazardous tasks, such as landing an aircraft in low visibility conditions. Within the disclosed system, a quality characteristic of signal between the head tracker and HWD components is determined, and the symbology displayed on the eyepieces of the HWD are altered based on the quality characteristic. The modified symbology quickly communicates to the user a confidence value on the accuracy of the symbology based on the tracker signaling without distracting or misleading the user.

FIG. 1 is a diagram of a HWD system 100, in accordance with one or more embodiments of the disclosure. The HWD system 100 includes a HWD 104. The HWD 104 may be of any size or type, and includes any head mounted display (HMD), head-mounted projected displays (HMPD) and retinal scanning displays (RSD), The HWD 104 includes one or two eyepieces 108 that receive and display symbology to the user. The eyepieces 108 may be of any type of display technology including organic light emitting displays (OLED), light emitting diode (LED) displays, liquid crystal displays (LCD), liquid crystal on silicon (LCoS) displays, and mini cathode ray tube (mini-CRT) displays.

The eyepieces 108 may be configured as spectacles/goggles, or may be incorporated into a helmet 112, hat or other head-worn equipment. The HWD system 100 further includes a camera 116 (e.g., a head tracking camera) coupled to the helmet 112, the eyepieces 108, or other aspects of the HMD system 100. The HWD system 100 may further include fiducials 120 arranged within the environment of the of the HWD system 100 (e.g., located on an interior surface of a cockpit) The fiducials 120 are recognizable by the HWD system 100 via the camera 116, and HWD system componentry, which enable the HWD system 100 to determine the position and orientation of the eyepieces 108 based on the angle and/or distances between each fiducial 120 and the camera. The fiducials 120 may be of any number (e.g., three to twenty), of any shape, and of any type. For example, the fiducials 120 may be configured as a set of four square bar-codes or QR codes.

The HWD system 100 further includes a tracker processing unit 124 configured to receive and process data from the camera (e.g., optical position/orientation data). In some embodiments, the tracker processing unit 124 is also configured to receive and process data from an inertial (acceleration and/or gyroscopic), or magnetic sensor.

Figure 2:
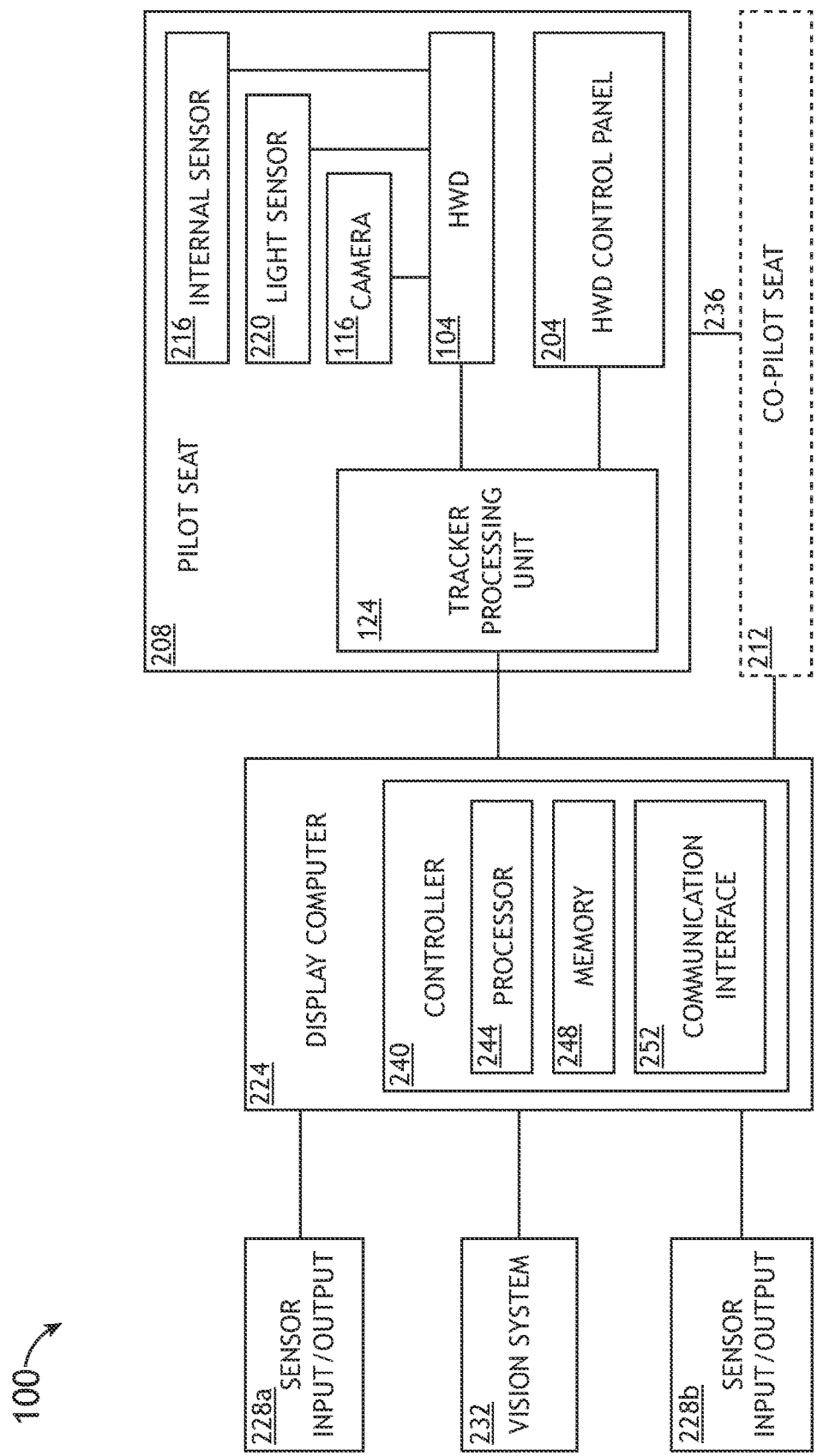
FIG. 2 is a block diagram of the componentry of the HWD system, in accordance with one or more embodiments of the disclosure.

FIG. 2 is a block diagram of the componentry of the HWD system 100, in accordance with one or more embodiments of the disclosure. The HWD system 100 may include a capacity for multiple users at one time (e.g., from 1 to 100 users). For example, the HWD system 100 may include a HWD 104, a tracking processing unit 124, and a HWD control panel 204 for both a pilot seat 208 and a copilot seat 212 (e.g., not shown for clarity). The copilot seat 212 may have one or more, or all, components of the pilot seat 208 and vice-versa. The control panel 204 is configured to allow a user to modify operation aspects of the HWD 104 including but not limited to brightness, and the ability to turn on or off a HWD mode, where turning off the HWD would remove any symbology from the eyepieces 108. It should be noted that the one or more users of the HWD system 100 may not be pilots or copilots, and that the HWD system 100 may be used for purposes other than operating a vehicle. Therefore, the above language is intended to provide an illustration of an embodiment of the HWD system 100, and not a limitation.

The HWD 104 may further include, or be communicatively coupled to, an inertial sensor 216 configured to collect inertial data that is sent to the tracker processing unit 124. For example, the HWD system 100 may be configured to operate as a hybrid optical/inertial tracking HWD system, with the inertial data generated via the inertial sensor 216. The HWD 104 may further include a light sensor 220 configured to determine levels of ambient light in and around the HWD 104. For example, the light sensor 220 may determine the amount of ambient light in a cockpit.

In embodiments, the HWD system 100 further includes a display computer 224 communicatively coupled to the tracker processing unit 124. The display computer 224 receives position and orientation information from the tracker processing unit 124, and renders images, such as symbology, based on the position and orientation information before the image is viewed on the eyepieces 108. The display computer 224 may also modify the symbology based on a quality of signal received from the tracker processing unit 124, the inertial sensor 216, the camera 116, the HWD 104, or other componentry.

The HWD system 100 may include, or is communicatively coupled to, sensor and data collection componentry that provide the display computer 224 with information that the display computer 224 translates into a symbology that is imaged onto the HWD 104. For example, the HWD system 100 may include, or is communicatively coupled to, one or more sensor input/outputs 228a-b that communicate sensor readings (e.g., sensor signals) to the HWD system 100, including but not limited to airspeed readings, altitude readings, position readings (e.g., GPS position readings), and fuel level readings. In another example, the HWD system 100 may include, or is communicatively coupled to, a vision system 232 that provides an image of the surrounding environment to the display computer 224. The vision system 232 may be configured as any type of image collecting system including but not limited to an enhanced vision system (EVS), an enhanced flight vision system (EFVS), a synthetic vision system (SVS), a combined vision system (CVS) a primary flight display (PFD)).

Components of the HWD system 100 as well as componentry communicatively coupled to the HWD system 100 rely on a digital information transfer systems (e.g., buses) for data transfer between componentry. The HWD system 100 may use any type of bus componentry or data transfer protocol including but not limited to an ARINC 429 data transfer standard/protocol and a ARINC 818 video interface and protocol standard. The HWD system 100 may use specialized data transfer links between system componentry, such as a HWD crosstalk bus 236 that provides communication between the HWD componentry of the pilot seat 208 with the HWD componentry of the Co-pilot seat 212. Components of the HWD system 100 may utilize parallel and/or serial busses for communication with other componentry, and one or more components may include power inputs (e.g., AC power or DC power). One or more components of the HWD system 100 may contain a controller 240 configured to provide processing functionality for the HWD system 100, including generating and/or modifying symbology for the HWD 104. As shown in FIG. 2, the display computer 224 includes the controller 240, which comprises one or more processors 244, a memory 248, and a computer interface 252. Other components of the HWD system 100, or componentry communicatively coupled to the HWD system 100 may also utilize controllers to perform processing functionality for the HWD system 100 including but not limited to the tracker processing unit 124, the HWD 104, the vision system 232, the sensor input/output 228a-b, the inertial sensor 216, and the camera 116.

The one or more processors 244 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 244 may include any device configured to execute algorithms and/or instructions (e.g., program instructions stored in memory 248). In one embodiment, the one or more processors 244 may be embodied as a desktop computer, a flight computer, mainframe computer system, workstation, image computer, parallel processor, networked computer, or any other computer system configured to execute a program configured to operate or operate in conjunction with the HWD system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration.

The memory 248 can be an example of tangible, computer-readable storage medium that provides storage functionality to store various data and/or program code associated with operation of the controller 240 and/or other components of the HWD system 100, such as software programs and/or code segments, or other data to instruct the controller 240 and/or other components to perform the functionality described herein. Thus, the memory 248 can store data, such as a program of instructions for operating the HWD system 100 or other components. It should be noted that while a single memory 248 is described, a wide variety of types and combinations of memory 248 (e.g., tangible, non-transitory memory) can be employed. The memory 248 can be integral with the controller, can comprise stand-alone memory, or can be a combination of both. Some examples of the memory 248 can include removable and non-removable memory components, such as a programmable logic device, random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 252 can be operatively configured to communicate with components of the controller 240 and other components of the HWD system 100. For example, the communication interface 252 can be configured to retrieve data from the controller 240 or other components, transmit data for storage in the memory 248, retrieve data from storage in the memory 248, and so forth. The communication interface 252 can also be communicatively coupled with controller 240 and/or system elements to facilitate data transfer between system components.

The display computer 224 and the tracking processing unit 124 work together to provide an accurate rendering of symbology to the display. For example, once the display computer 224 has generated symbology data (e.g., based on inputs from the sensor input/output 228a-b and/or vision system 232), the display computer 224 then receives tracking data from the tracking processing unit 124 and modifies the symbology accordingly. For instance, the tracking processing unit 124 may send position and orientation data that the tracking processing unit 124 has itself processed from inputs from the tracker camera 116, the inertial sensor 216, the light sensor 220, the HWD 104, and/or the control panel 204. The position and orientation data may include pose data, pose algorithms, command and control data, and other inputs that facilitate accurate rendering by the display computer 224.

In embodiments, the HWD system 100 is configured to determine if a position and orientation signal (e.g., containing the position and signal data) is a quality signal (e.g., having a quality signal value). Data signaling can be disrupted at several points within the HWD system 100. For example, one or more sensors (e.g., the camera 116, the inertial sensor, or the light sensor), may become compromised, or otherwise not perform competently. For instance, the one or more sensors may have an internal malfunction, such as a short circuit. In another instance, the componentry of the one or more sensors (e.g., the camera 116) may be affected by an environmental issue, such as smoke in a cockpit. In another example, data may be disrupted at one or more data busses that connect components of the HWD system 100. One or more processors from the display computer 224, the tracker processor unit 124, and/or other components may determine whether one or more data signals sent to and/or received by the display computer 224 and/or the tracker processing unit 124 are high-quality data signals or low-quality data signals. The display computer 224 receives these inputs (e.g., as signal quality values) and generates an overall quality-of-service (QoS) value, which provides both an estimate on the accuracy and/or precision of the data, or specific data components (e.g., attitude data) received by the display computer 224, and assists in determining what modifications, if any, need to be made to the symbology generated by the display computer 224 that communicate to the user the accuracy/precision of one or more symbols of the HWD symbology in real time.

The HUD system 100 is configured to display symbology on the HWD 104 that is modified based on the predicted accuracy of the symbology (e.g., QoS value). Modifications to any symbol of symbology may be made upon any accuracy prediction. For example, the for HWD system 100 operating with high-accuracy and/or high QoS values (e.g., indicating a 99.9% of accuracy or high precision), a symbol within the symbology may appear as a default symbol, or as a symbol modified to represent high accuracy. Conversely, for a HWD system 100 operating with low-accuracy and/or low QoS values (e.g., indicating less than 95% accuracy or low precision), a symbol may appear as a degraded symbol modified to represent low accuracy or may be removed entirely. Other modifications between a default symbol, a degraded symbol, and/or a high-accuracy/precision symbol may include changes in color, and changed in line type (e.g., dotted line versus solid line).

Figure 3A:
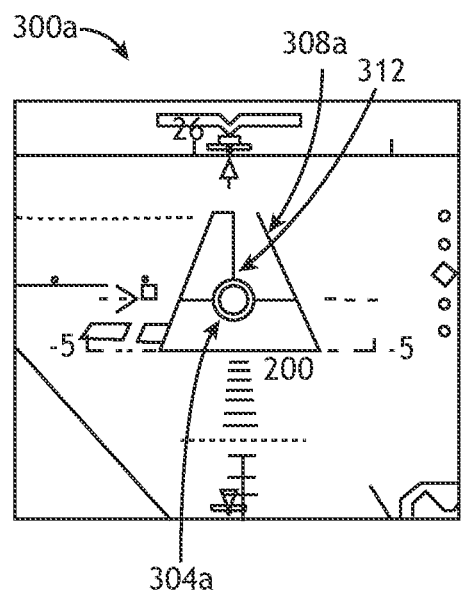
FIG. 3A are drawings illustrating snapshots of an HWD display, in accordance with one or more embodiments of the disclosure.
Figure 3A:
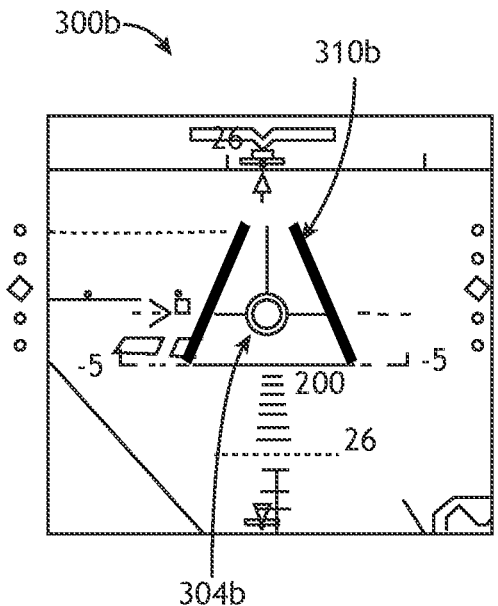
Figure 3A:
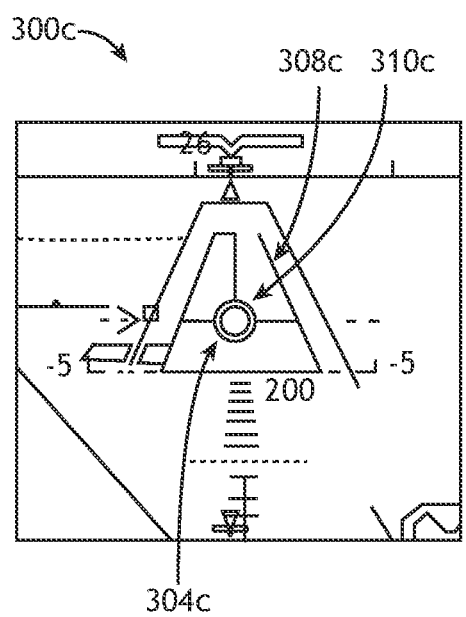
Figure 3A:
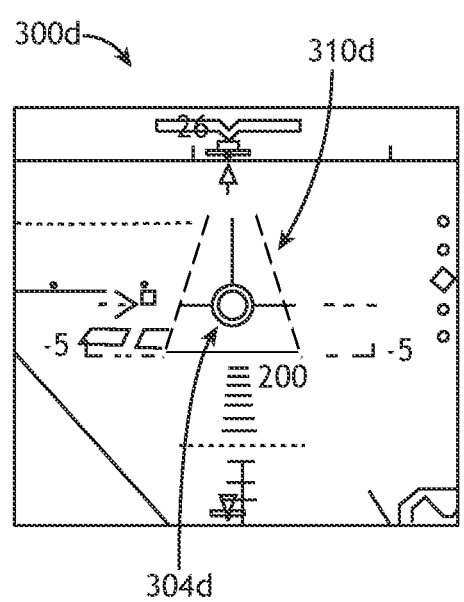

Examples of the symbology from HWD systems 100 operating under high or low QoS values are shown in FIG. 3A, which illustrate snapshots of displayed HWD images 300a-d derived from the vision system 232, each including a runway 304a-d (e.g., a path), in accordance with one or more embodiments of the disclosure. The displayed HWD images 300a-d emulate what a pilot would see when attempting to land and aircraft via the HWD 104 under different QoS value conditions (e.g., 304a under high QoS, 304b-d, under low QoS). These different QoS value conditions are based on the accuracy/precision of incoming data from the tracker processing unit 124 and indicate to the pilot the relative accuracy of the runway in an Earth-centered/Earth-fixed coordinate (ECEF) frame. For example, in displayed HWD image 300a, a high-confidence line 308a is shown that mimics the boundary of the runway 304a. This singular high-confidence line 308a may indicate that the HWD system 100 is working under high QoS value conditions, and that the display as shown is highly correlative (e.g., accurate and/or precise) to the actual environment. For example, the high-confidence line 308a may indicate to the pilot that the midline 312 of the runway 304 as shown is a predicted to be within 95% to be within one meter of the actual midline of the actual runway.

Symbology modifications based on QoS value conditions may be applied to a single symbol within the symbology displayed on the display, a set of symbols within the symbology displayed on the display, or all symbology displayed on the display. For example, changes in a QoS value may result in all earth-referenced/conformal signals being modified. For instance, and in reference to FIG. 3A. all earth-referenced signals, including the outline/boundary of the runway 304, may be altered according to the QoS value. Therefore, the above description should not be considered a limitation of the HWD system 100, but as an illustration.

The modification of a symbol within the symbology to show high or low confidence may be presented in any number of ways. For example, the displayed HWD image 300b may show a differentially-colored low-confidence line 310b (e.g., indicated by the thickened line), indicating a low QoS condition (e.g., poor signals received from the tracker processing unit 124, the camera 116, or the inertial sensor 216). In another example, the displayed HWD image 300c may present the low-confidence line 310c in addition to the default high-confidence line 308c. For instance, the distance between the low-confidence line 312c and the high confidence line 308c may give an indication of the confidence level that the displayed runway 304 is presented correctly (e.g., the greater distance indicating a decreased QoS condition). In another example, the HWD image 300d, may present the low-confidence line 312d as a dotted line.

In some embodiments, the QoS value comprises an accuracy characteristic, for which a symbol is modified based on the accuracy characteristic and displayed on the HWD 104. For example, the symbol may be displayed as a degraded or missing signal. For instance, and as shown above, upon a determination that the QoS value has a low accuracy characteristic (e.g., less than 95% accurate), the high-confidence line 308 may be removed. The symbol may also be modified based on a precision characteristic, for which a symbol is modified based on the accuracy characteristic and displayed on the HWD 104. For example, and as shown above, upon a determination that the QoS value has a low precision characteristic (e.g., less than one meter of precision), the high-confidence line 308 may be replaced with a low-precision line 310 (e.g., a degraded symbol).

In some embodiments, the symbology with the HWD system 100 is configured to change quantitatively based on the QoS value. For example, the high-confidence line 308a may transform from a solid line to a highly broken/dotted line increase depending on the level of accuracy of the symbol as determined by the QoS value. For instance, a symbol with a predicted accuracy of 99% may be configured as a solid high-confidence line 308a, whereas a symbol with a predicted accuracy of 95% may be configured as a dashed high-confidence line 308a (e.g., 2 dashes per cm), and a symbol with a predicted accuracy of 90% may be configured as a dotted high confidence line 308a (e.g., 4 dots per cm). The symbology may utilize any type of transformation of a symbol to represent a change in QoS.

In another example, a confidence line 308 may be assigned a specific color based upon the predicted accuracy of the symbol (e.g., red for a predicted accuracy of 95%, and green for a predicted accuracy of 99%).

In some embodiments, the QoS value is based on accuracy/precision characteristics of data received by the sensor input/output 228a-b and/or vision systems 232, or may be based on accuracy/precision characteristics of data received by both the sensor input/output 228a-b and/or vision systems 232, as well as the tracking inputs received from the tracking processing unit 124 and related componentry (e.g., the inertial sensor 216, the camera 116, the light sensor 220, and/or the HWD 104.) For example, an attitude sensor that is performing slightly out of normal operating parameters may not necessarily result in a low QoS value. However, the same attitude sensor that reports to a HWD system 100 with a camera 116 that is slightly performing out of normal operating parameters may additively result in a low QoS value condition, resulting in modified attitude symbology, such as that shown in FIG. 3B. Here, displayed HWD images 300e-f indicate a displayed HWD image 300e under high QoS value conditions and a displayed HWD image 300f under low QoS value conditions, the low QoS value cause by both the attitude sensor and the camera 116 performing slightly out of normal operating parameters. The symbology associated by the attitude sensor, the horizon pitch 316 and the pitch ladder 320 are removed from the HWD 104, indicating that the attitude measurements are not to be relied on. However, because the other sensors are working properly, and do not cause low QoS value conditions even with the camera 116 operating out of normal operating parameters, the corresponding symbols, such as the flight path vector 322, does not change.

In some embodiments, the QoS value is based on a signal strength characteristic. For example, and as shown FIG. 3B, the low QoS value may be due to a loss of signal strength from either the attitude sensor or the camera 116.

In some embodiments, a low QoS condition may result in the appearance of one or more low QoS icons 324 (e.g., the "Low Q" square in FIG. 3C) appearing on the HWD image 300g. For example, the low QoS icon 324 may appear when the HWD orientation is not to be trusted. The low QoS icon 324 may be head-referenced to ensure that the symbol is always visible regardless of the head orientation or the loss of competence in the head tracker or tracker processing unit 124 (e.g., the low QoS icon 324 is internally consistent and referenced to the head). The low QoS icon 324 may be configured as any shape, size, or type of signal. For example, the low QoS icon 324 may have an appearance similar to a standby instrument symbol or an unusual altitude symbol.

Figure 4:
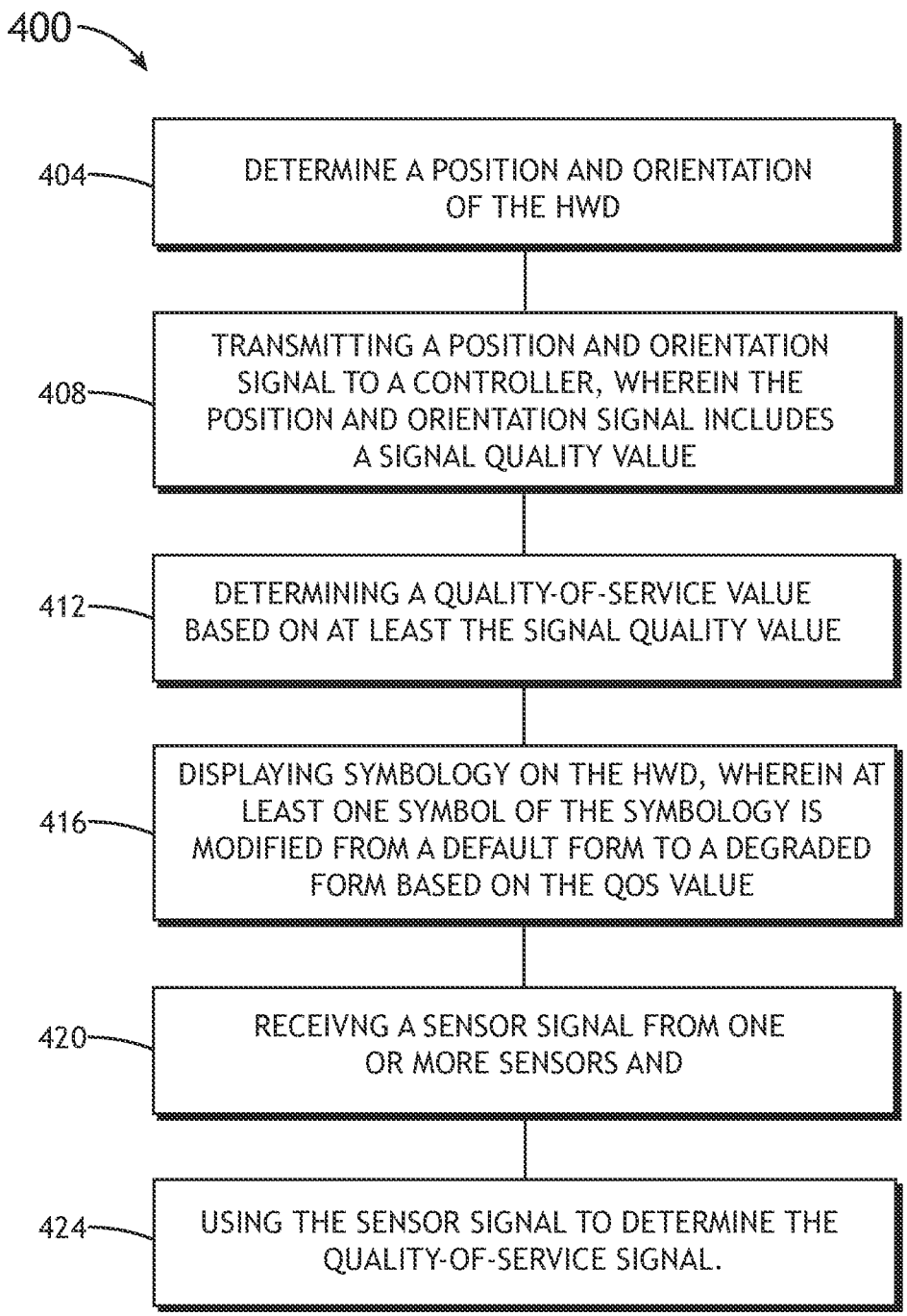
FIG. 4 is a flowchart illustrating a method for modifying symbology displayed on a HWD based on a quality-of-service value, in accordance with one or more embodiments of the disclosure.

FIG. 4 is a flowchart illustrating a method 400 for modifying symbology displayed on a HWD based on a quality-of-service value, in accordance with one or more embodiments of the disclosure. The method 400 may be used by any HWD system 100 including but not limited to EVS-based HWD systems 100 for aircraft.

In some embodiments, the method includes a step 404 of determining a position and orientation of the HWD 104. For example, the tracking processing unit 124 may determine the position and orientation of the HWD 104, components of the HWD (e.g., eyepieces 108, and/or the head/eyes of the pilot, based on the position of HWD 104 and/or HWD components.

In some embodiments, the method 400 further includes a step 408 of transmitting a position and orientation signal to the controller 240, wherein the position and orientation signal includes a signal quality value. For example, the tracking processing unit 124 may transmit a position and orientation signal to the display computer 224 that includes not only the calculated position and orientation of the HWD 104, but also a signal quality value that indicates how precise, and/or strong the signal is.

In some embodiments, the method 400 further includes a step 412 of determining a quality-of-service value based on at least the signal quality value. For example, the display computer, having received a quality signal value from the tracker processing unit 124 may assign a QoS value based on the quality signal value. The QoS value may also include inputs from other components of the HWD system 100 and communicatively coupled componentry.

In some embodiments, the system includes a step 416 of displaying symbology on the HWD, wherein at least one symbol of the symbology is modified from a default form to a degraded form based on the QoS value. For example, and as shown in displayed HWD images 300a,d of FIG. 3A, a default form of a symbol, the solid high-confidence line 308, may be modified to a degraded form such as the dotted low-confidence line 314 based on a determined QoS value.

Figure 3B:
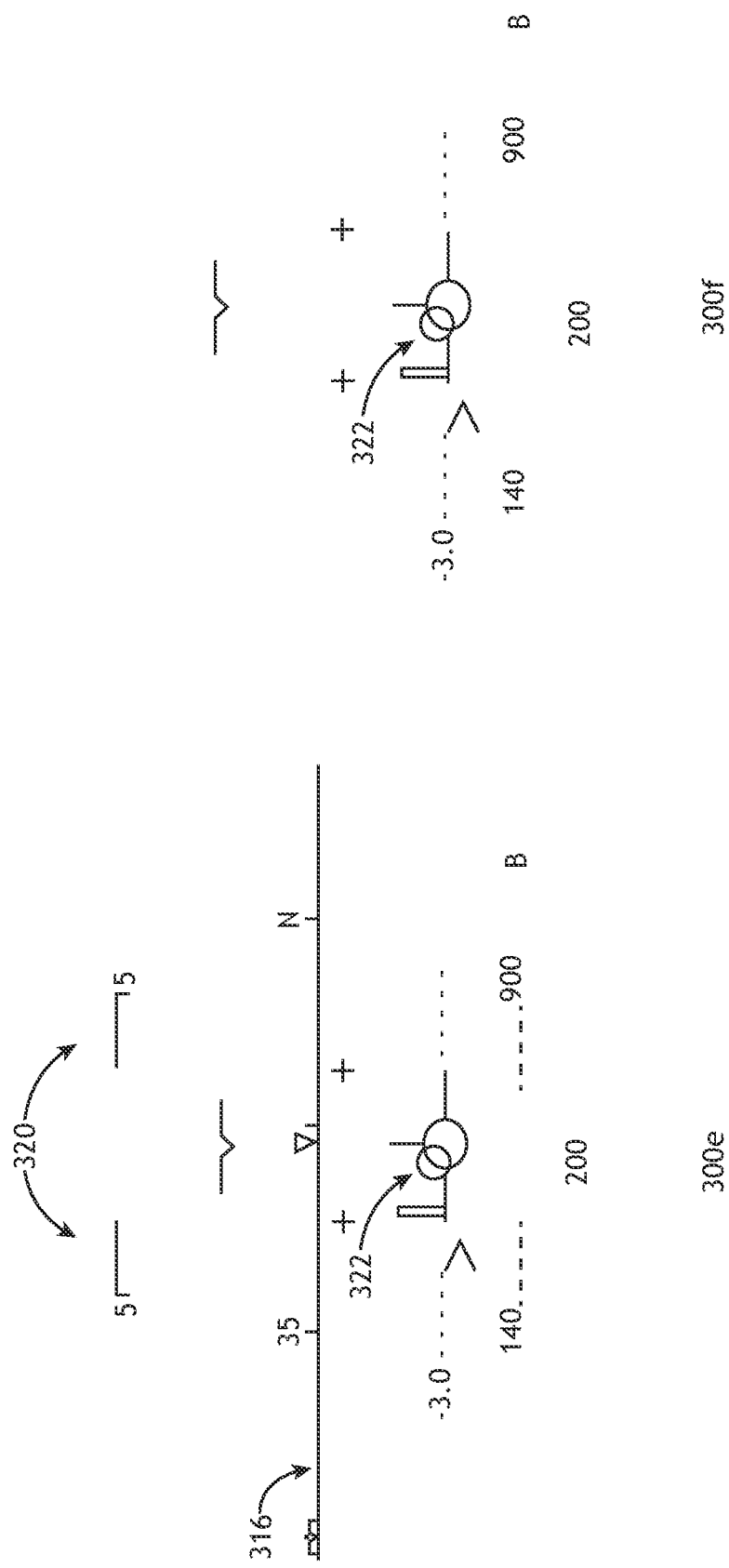
FIG. 3B are drawings illustrating snapshots of an HWD display, in accordance with one or more embodiments of the disclosure.
Figure 3C:
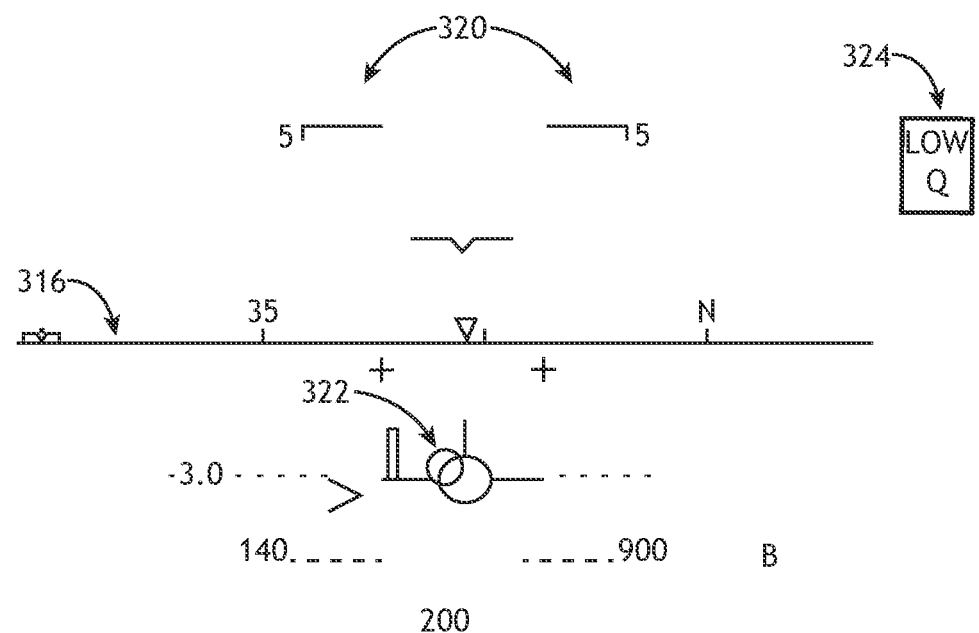
FIG. 3C is a drawing illustrating a snapshot of an HWD display, in accordance with one or more embodiments of the disclosure.

In some embodiments, the method 400 further includes steps that involve sensor signals from sensors that include but are not limited to the sensor input/output 228a-b and vision systems 232. For example, in some embodiments, the method 400 further includes a step 420 of receiving a sensor signal from one or more sensors. The method may further include a step 424 of using the sensor signal to determine the quality-of-service value. For example, and as shown in FIG. 3B, performance issues in the attitude sensor and the camera 116 may contribute to a low QoS value that leads to specific symbols of the attitude sensor, the horizon pitch 316 and the pitch ladder 320 being removed from the symbology, whereas performance issues in the attitude sensor and the camera 116, when considered individually, would not lead to a change in symbology. In cases where the symbol is removed, another symbol may replace the removed symbol. For example, in the case where the horizon pitch 316 and the pitch ladder 320 symbols are removed, the symbols may be replaced by a simple heading compass.

The HWD system 100 and method 400 may be used with any type of symbology. For example, the HWD system 100 and method 400 may be used to modify aircraft-related symbology for HWD systems used on board an aircraft. For instance, the aircraft-relate symbology used may include but not be limited to command heading marker symbology, true heading indicator symbology, heading symbology, rate of climb/descent symbology, altitude symbology, barometric setting symbology, waterline symbology, course line symbology, horizon symbology, extended horizon bar symbology, elevation deviation symbology, energy symbology (e.g., an energy caret), azimuth deviation symbology, gear up/down symbology, ILS steering symbology, course line steering symbology, flight path symbology, pitch ladder symbology, AOA bracket symbology, velocity vector symbology, bank angle symbology, ghost velocity vector symbology, peak aircraft g-force symbology, aircraft g-force symbology, Mach number symbology, angle of attach symbology, airspeed symbology, landing zone symbology, great circle steering symbology, as well as symbology representing any object detected by the vision system 232 (e.g., a path or runway 304. It should be understood that symbology may not be limited to shapes. For example, the symbology may include, or only contain, text.

In another example, the symbology modified within the method 400 and HWD system 100 may include a flight path circle, wherein the circle size is increased as an accuracy of the HWD signaling decreased to demonstrate the angular accuracy of a presentation of a flight path. The flight path circle could also be changed to a dashed or dotted line representation.

In some embodiments, the HWD system 100 and/or method 400 may be configured to remove or modify checklist action prompts if the tracking environment is degraded. For example, buttons appearing on the HWD prompting the use to check aircraft components (e.g., check status light, or check oxygen bottle) may appear in a degraded state (e.g., having a dotted outline) upon the HWD system 100 operating in a degraded tracking environment, which communicates to the user the degraded tracking status.

As demonstrated in FIG. 3A, any reference point that has symbology rendered at its location (e.g., the runway 304) could utilize size, shape, and color to indicate relative accuracy in an ECEF frame. Uncertainty for such point features may also be represented by more traditional error ellipses when appropriate. For example, and as shown in FIG. 3A, the width of lines, such as runway lines, could be increased or otherwise modified to indicate the area where the runway is expected to be located. The runway lines could also be removed entirely if the accuracy of the head tracking solution is too low. In some cases, symbology color can be modified to reflect "binary for credit" checks against FAA regulations.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system, comprising:
   a head worn display configured to display symbology of an operating environment;
   a tracking camera;
   a tracking processing unit communicatively coupled to the tracking camera configured to:
     determine a position and orientation of the head worn display; and
     transmit a position and orientation signal to a controller, wherein the position and orientation signal includes a signal quality value; and
   the controller communicatively coupled to the head worn display and the tracking camera comprising:
     one or more processors; and
     a memory with instructions stored upon, that when executed by the one or more processors, cause the one or more processors to:
       display the symbology on the head worn display;
       determine a quality-of-service value based on at least the signal quality value; and
       modify, graphically, at least one symbol of the symbology based on the quality-of-service value from a default symbol to a degraded symbol if based on the quality-of-service value changing from a high-quality value to a low-quality value.

2. The system of claim 1, wherein the instructions further cause the one or more processors to:
   receive a sensor signal from one or more sensors; and
   use the sensor signal to determine the quality-of-service value.

3. The system of claim 1, wherein the quality-of-service value comprises an accuracy characteristic.

4. The system of claim 1, wherein the quality-of-service value comprises a precision characteristic.

5. The system of claim 1, wherein the quality-of-service value comprises a signal strength characteristic.

6. The system of claim 1, wherein the degraded symbol is configured as a removed symbol.

7. The system of claim 1, wherein the degraded symbol is configured with a different color than the default symbol.

8. The system of claim 1, wherein the degraded symbol is configured with a different line width than the default symbol.

9. The system of claim 1, wherein the degraded symbol is configured with a different line type than the default symbol.

10. The system of claim 1, wherein the controller is communicatively coupled to a vision system.

11. The system of claim 1, further comprising an inertial sensor communicatively coupled to at least one of the head worn display or the tracking processing unit.

12. The system of claim 1, wherein the at least one symbol represents a confidence line of a path.

13. The system of claim 12, wherein the path is configured as a runway.

14. A method for modifying symbology displayed on a head worn display (HWD) based on a quality-of-service value comprising:
   determining a position and orientation of the HWD;
   transmitting a position and orientation signal to a controller, wherein the position and orientation signal includes a signal quality value;
   determining a quality-of-service value based on at least the signal quality value; and
   displaying symbology on the HWD, wherein at least one symbol of the symbology is graphically modified from a default form to a degraded form based on the quality-of-service value.

15. The method of claim 14, further including:
   receiving a sensor signal from one or more sensors; and
   using the sensor signal to determine the quality-of-service value.

* * * * *